United States Patent [19]

Gilchrist

[11] Patent Number: 5,073,878

[45] Date of Patent: Dec. 17, 1991

[54] CIRCUIT FOR DRIVING AN ACOUSTIC TRANSDUCER

[75] Inventor: Ian R. Gilchrist, Timonium, Md.

[73] Assignee: Cyber Scientific, Baltimore, Md.

[21] Appl. No.: 606,551

[22] Filed: Oct. 31, 1990

[51] Int. Cl.[5] .............................................. H04B 1/02

[52] U.S. Cl. .................................... 367/137; 367/903

[58] Field of Search ................. 367/137, 105, 903, 96, 367/99; 73/626

[56] References Cited

U.S. PATENT DOCUMENTS 4,706,227 11/1987 DuVall et al. ........................ 367/96

4,953,141 8/1990 Novak et al. ......................... 367/99

*Primary Examiner*—Daniel T. Pihulic

*Attorney, Agent, or Firm*—Perman & Green

[57] ABSTRACT

A driver circuit for an acoustic transducer includes a voltage regulator that provides a regulated DC output level for a high value load impedance and when the load impedance falls to a low value, its DC output exhibits a substantially reduced level. A transformer is connected between the voltage regulator and the acoustic transducer. A switching circuit is connected to the transformer and is responsive to a leading edge of a pulse input signal to reflect a low value impedance through the transformer to the voltage regulator. The switching circuit is further responsive to a lagging edge of a pulse input signal to reflect a high value impedance to the voltage regulator. A capacitive reactance circuit is coupled to the transformer and is responsive to the switching circuit reflecting a low value impedance to manifest a reduced charge state. When the switching circuit receives the lagging edge of the pulse input signal, the capacitive reactance circuit is recharged to the regulated DC output level, but over a charge time which prevents a step function signal from appearing across the transformer.

5 Claims, 2 Drawing Sheets

CIRCUIT FOR DRIVING AN ACOUSTIC TRANSDUCER

FIELD OF THE INVENTION

This invention relates to acoustic transducer driver circuits and, more particularly, to a circuit which causes an acoustic transducer to produce an ultrasonic output only during a single transition of an applied driver pulse.

BACKGROUND OF THE INVENTION

Acoustic position locating systems known in the prior art include a variety of ultrasonic signal generating means. Some systems employ a pointer having an incorporated spark gap. The spark gap generates an acoustic signal which is propagated to orthogonally oriented, linear microphones. Other systems employ acoustic transducers which emit periodic, acoustic signals that are received by appropriately located microphones. Circuitry measures the propagation time of the acoustic signal between the emitter and the respective receivers, with the propagation times being converted into distances to enable the location of the transmitter. One example of the latter type of ultrasonic position locating system can be found in U.S. Pat. Ser. No. 07/412,885 now U.S. Pat. No. 4,991,148 filed Sept. 26, 1989 to the inventor hereof.

In such systems, it is important that the signal transmitted by the acoustic transducer be of a limited duration. An acoustic signal having a long "tail" or other continuing signal characteristic will cause various reflections to occur which are difficult to accommodate in the receiving circuitry. One prior art technique used to achieve such limited duration acoustic signals has been to provide mechanical dampening for the ultrasonic transducer that causes the signal to be foreshortened. The problem with such mechanical damping is that, in addition to shortening the signal, it also decreases the signal amplitude of the initially generated acoustic wave.

The application of a pulsatile signal to an acoustic transducer causes ultrasonic oscillations thereof on both the leading and lagging edges of the pulse. This occurs because the acoustic transducer is responsive to a step function voltage to produce an acoustic output, irrespective of the direction of transition of the energizing signal. The transducers response to the lagging edge of the pulse signal extends the time duration of the generated acoustic signal and results in an undesirably long signal waveform.

Accordingly, it is an object of this invention to provide a circuit for driving an acoustic transducer that enables the transducer to provide an optimum duration output signal.

It is another object of this invention to provide an improved circuit for driving an acoustic transducer which makes use of circuitry already present in the system to improve the quality of a transducer's output signal waveform.

SUMMARY OF THE INVENTION

A driver circuit for an acoustic transducer includes a voltage regulator that provides a regulated DC output level for a high value load impedance and when the load impedance falls to a low value, its DC output exhibits a substantially reduced level. A transformer is connected between the voltage regulator and the acoustic transducer. A switching circuit is connected to the transformer and is responsive to a leading edge of a pulse input signal to reflect a low value impedance through the transformer to the voltage regulator. The switching circuit is further responsive to a lagging edge of a pulse input signal to reflect a high value impedance to the voltage regulator. A capacitive reactance circuit is coupled to the transformer and is responsive to the switching circuit reflecting a low value impedance, to manifest a reduced charge state. When the switching circuit receives the lagging edge of the pulse input signal, the capacitive reactance circuit is recharged to the regulated DC output level, but over a charge time which prevents a step function signal from appearing across the transformer.

DETAILED DESCRIPTION OF THE INVENTION

Figure 1:
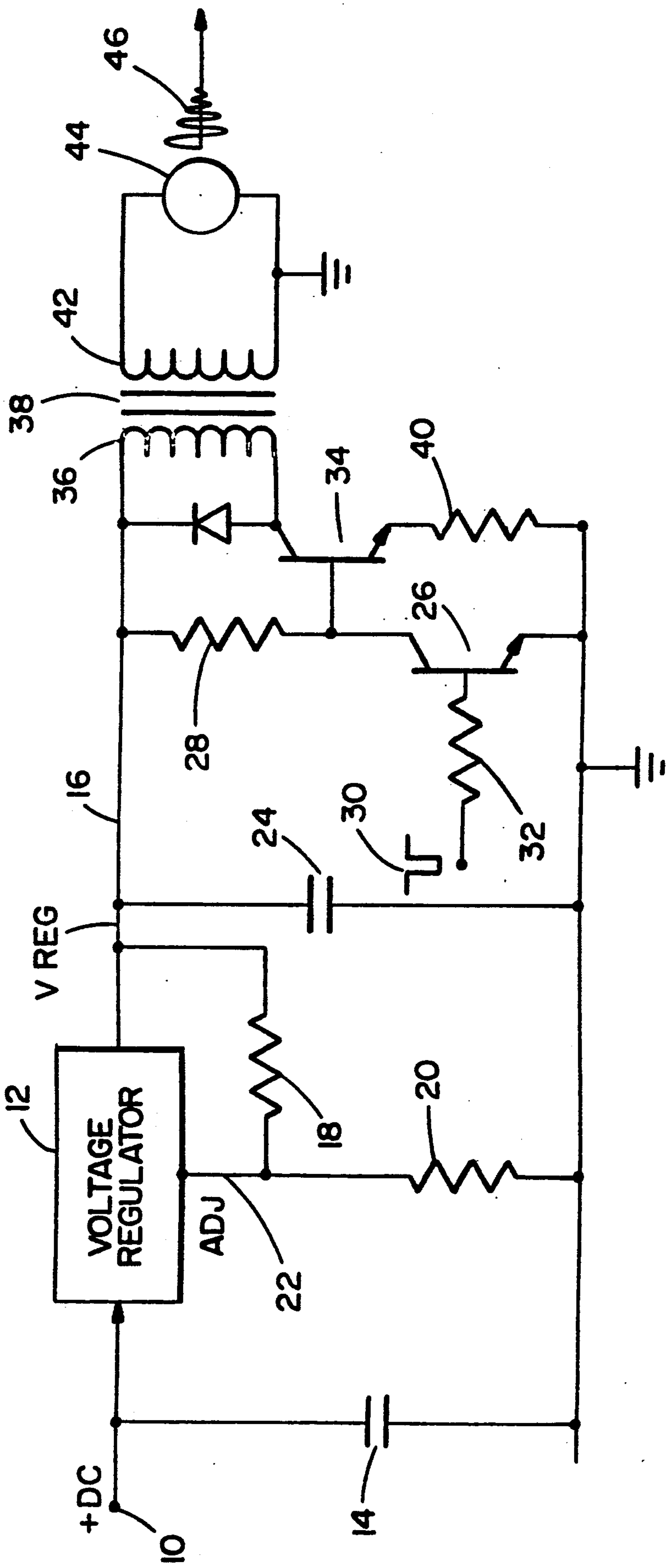
FIG. 1 is a circuit diagram of a transducer driving circuit incorporating the invention hereof.

Referring now to FIG. 1, a DC level is impressed on terminal 10 and applied to voltage regulator 12. An output from voltage regulator 12 is applied to conductor 16. Resistors 18 and 20 provide an error feedback voltage to adjustment terminal 22 in voltage regulator 12. A capacitor 24 is connected between conductor 16 and ground. One function of capacitor 24 is to act as a bypass capacitor for voltage ripple.

A driver transistor 26 is connected between conductor 16 and ground through resistor 28. A negative going drive pulse 30 is applied via resistor 32 to the base of transistor 26. Normally, transistor 26 is in the conducting state and becomes nonconduct upon the appearance of the leading edge of negative-going pulse 30. At such time, the collector potential of transistor 26 rises, thereby causing a connected Darlington transistor 34 to become heavily conductive and to enable current flow through primary coil 36 of transformer 38. That current flow passes through transistor 34 and low impedance resistor 40 to ground. The resulting current flow in primary coil 36 is induced into secondary coil 42 and thereby causes acoustic transducer 44 to generate an acoustic signal 46. Prior to discussing the detailed operation of the circuit of FIG. 1 during the lagging edge of input pulse 30, the operation of voltage regulator circuit 12 will be considered. Voltage regulator circuit 12, capacitor 14, resistors 18 and 20 and capacitor 24 are known in the prior art and comprise the power supply circuitry for the driver circuit. For instance, a voltage regulator providing 100MA output current can be obtained from the National Semiconductor Company and is designated as the LM 317L, 3-terminal, adjustable regulator. Voltage regulator 12 is a positive voltage regulator capable of supplying a given output current over a range of output voltages. Resistors 18 and 20 provide a feedback voltage to adjustment terminal 22 that enables voltage regulator 12 to maintain the output level on conductor 16 at a predetermined voltage so long as the output impedance seen thereon is high above a predetermined level.

Voltage Regulator 12 is also provided with current limiting circuits for overload and short circuit protection. When the impedance seen on conductor 16 falls to a low level, it is characteristic of such a voltage regulator circuit for its output level to fall precipitously, in an attempt to maintain a minimum output current. For instance, assuming that the DC level applied to terminal 10 is 12 volts, voltage regulator circuit 12 will produce approximately 10 volts on conductor 16. If the impedance seen from voltage regulator 12 between conductor 16 and ground falls to a low level, the circuitry within voltage regulator 12 goes into a saturated state, its output potential falls to a low level (e.g. 1.5 volts) and remains there until the impedance seen between conductor 16 and ground increases to the high level. At such time, the voltage regulator circuitry begins to again produce the ten volt output.

When voltage regulator circuit 12 provides its normal DC regulated output, capacitor 24 is charged to and maintains that level. As aforestated, it also acts as a ripple suppressant. When the output from voltage regulator 12 falls as a result of seeing a low impedance between conductor 16 and ground, capacitor 24 rapidly discharges through the low impedance path, at the same time the output from voltage regulator 12 is falling. Thus, a precipitous decrease in voltage is seen on conductor 16. When, however, the impedance seen between conductor 16 and ground increases to the high level, voltage regulator 12 begins to again apply its regulated output to conductor 16. Capacitor 24 then begins to charge, but does so slowly, depending upon its size. This, in effect, causes a ramp potential to appear on conductor 16 during the charge time of capacitor 24 and prevents a step function voltage from appearing thereon. Capacitor 24 is therefore selected to provide the desired ramp response.

Figure 2:
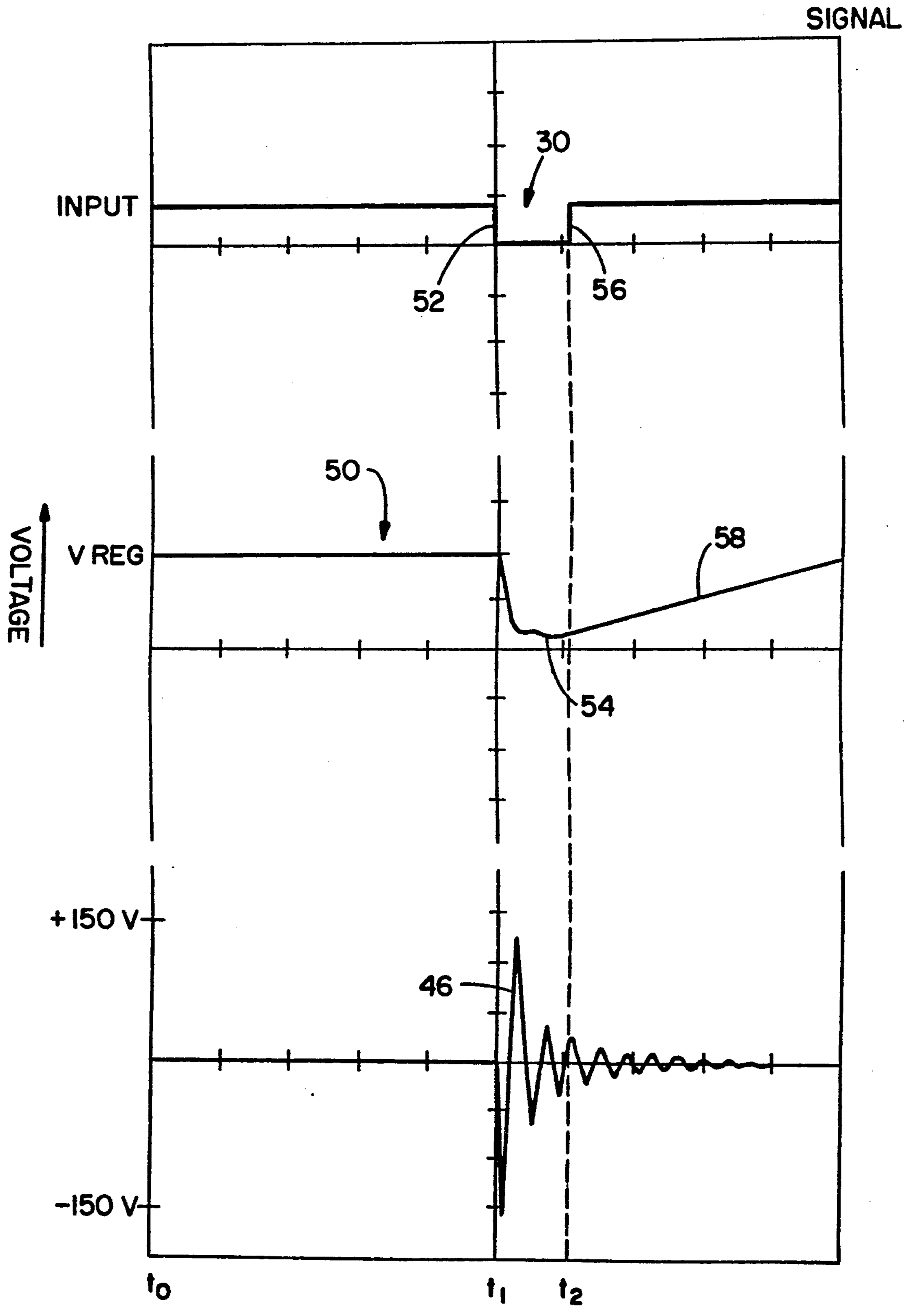
FIG. 2 are waveform diagrams helpful in understanding the operation of the circuit of FIG. 1.

Referring now to FIGS. 1 and 2, the detailed operation of the circuit of FIG. 1 will be hereinafter described. FIG. 2 includes three traces, the first of which is a trace of an input pulse 30 as it is applied, via resistor 32, to transistor 26. The second trace 50 is the voltage appearing on line 16 both before, during and after input pulse 30. The third trace shows oscillatory signal 46 as generated by transducer 44 in response to input pulse 30.

Prior to input pulse 30 being applied (e.g. at time t0 in FIG. 2), transistor 26 is conductive and 34 is nonconductive, thereby reflecting a high impedance onto conductor 16. As a result, the regulated voltage level on conductor 16 remains steady. Capacitor 24 is fully charged to that voltage.

When the negative going leading edge 52 of input pulse 30 appears at time t1, transistor 26 ceases conduction and 34 is rendered heavily conductive. Since resistor 40 has a very low value (e.g. 0.1 ohms), conductor 16 sees between itself and ground, only the resistive part of the impedance of primary winding 36, the internal resistance of transistor 34 and the very low resistance of resistor 40. As a result, two actions occur. First, capacitor 24 discharges immediately through the aforesaid circuit and the current output from voltage regulator 12 increases rapidly. The internal regulation mechanisms within voltage regulator circuit 12 cause the circuitry therein to go into saturation, thereby dropping the potential on conductor 16 from the regulated level down to a low, but stable level (e.g. from 10 volts to 1.5 volts). The resulting current pulse passing through primary coil 36 is reflected into secondary coil 42 and causes transducer 44 to produce oscillatory signal 46.

After the above action occurs, the charge on capacitor 24 stabilizes at the low output level then being manifest from voltage regulator 12 (e.g. level 54 as seen on trace 50 in FIG. 2). When however, the positive going transition 56 of input signal 30 occurs, transistor 26 is rendered conductive and causes transistor 34 to become nonconductive. This causes a high impedance to be seen on conductor 16, and voltage regulator 12 immediately attempts to raise the level thereon to the regulated voltage output level. However, capacitor 24 having been previously heavily discharged, prevents this from occurring.

As can be seen in FIG. 2, capacitor 24 charges slowly and produces a ramp potential 58 on conductor 16, which ramp potential is applied via primary coil 36 to secondary coil 42 of transformer 38. Ramp potential 58 does not produce the required step function potential needed to cause transducer 44 to generate an acoustic output.

It can thus be seen that acoustic transducer 44 is only energized on the negative going transition of input 30 and is not reenergized on the positive going transition. This enables the resulting output signal 46 to be produced upon the initiation of the input signal and prevents a second, potentially confusing, output from being propagated from transducer 44 upon the positive going transition.

The above circuit therefore enables the utilization of a conventional voltage regulator circuit both to supply regulated bias potentials for the driving circuitry, and, at the same time, uses already available circuitry to prevent a second transition of the input signal from causing an output acoustic wave. Preferred values for the circuit shown in FIG. 1 are as follows:

Regulator 12 —LM 317L (100MA output current)
Capacitor 14 —0.1 microfarads
Resistor 18–220 ohms
Resistor 20–1.5 K ohms
capacitor 24–6.8 microfarads
transistor 26–2N 2222
Darlington transistor 34—MPS A14
resistor 28–2K ohms
resistor 32–20K ohms
resistor 40–0.1 ohms
primary coil 36 resistance-0.4 ohms It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A circuit for driving an acoustic transducer, said transducer responsive to a step function signal to produce an acoustic frequency output, said circuit comprising:

a voltage regulator for providing a regulated DC output level across a high impedance load, and further responsive to a low impedance load, to provide a substantially reduced DC output;

transformer means connected between said voltage regulator and said acoustic transducer;

switch means connected to said transformer means and responsive to a leading transition of a pulse input signal to apply a low impedance load through said transformer means to said voltage regulator, and further responsive to a lagging transition of said pulse input signal to apply a high impedance load through said transformer means to said voltage regulator; and capacitive reactance means coupled to said transformer means and responsive to said switch means application of a low impedance load, to rapidly discharge through said transformer means, said discharge causing said transducer means to generate an acoustic frequency output, and further responsive to said switch means application of said high impedance load, to accept charge from said voltage regulator, thereby applying a gradually increasing potential to said transformer means which is insufficient to cause said transducer means to produce an acoustic frequency output.

2. The circuit as defined in claim 1 wherein said transformer means comprises a primary coil and a secondary coil, said secondary coil connected to said acoustic transducer.

3. The circuit as defined in claim 2 wherein said switch means comprises a transistor having its collector connected to said primary coil of said transformer means and its emitter connected through a low impedance to a source of common potential.

4. The circuit as defined in claim 3 wherein said capacitive reactance means is a capacitor coupled between the output of said voltage regulator and a source of common potential, said capacitor initially caused to discharge by the conduction of said transistor connected to said transformer primary coil and to commence charging by the nonconduction of said transistor.

5. The circuit as defined in claim 4 wherein the capacity of said capacitor is chosen to assure that its charge time prevents the imposition across said primary coil of said transformer means of a step function signal upon said lagging transition of said pulse input signal.

* * * * *